July 29, 1924.
J. T. CRAWFORD
CULTIVATOR ATTACHMENT
Filed April 25, 1923
1,503,414
2 Sheets—Sheet 1
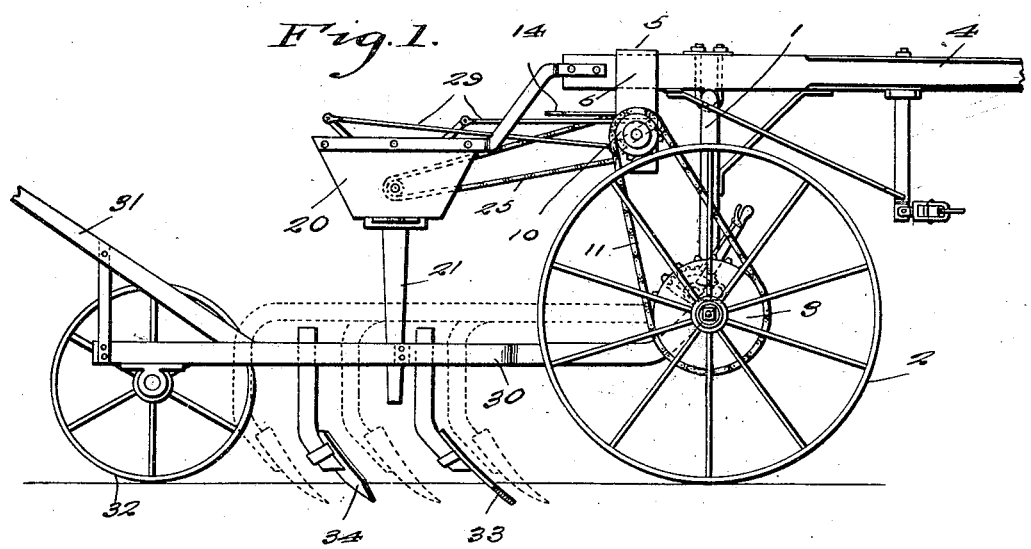
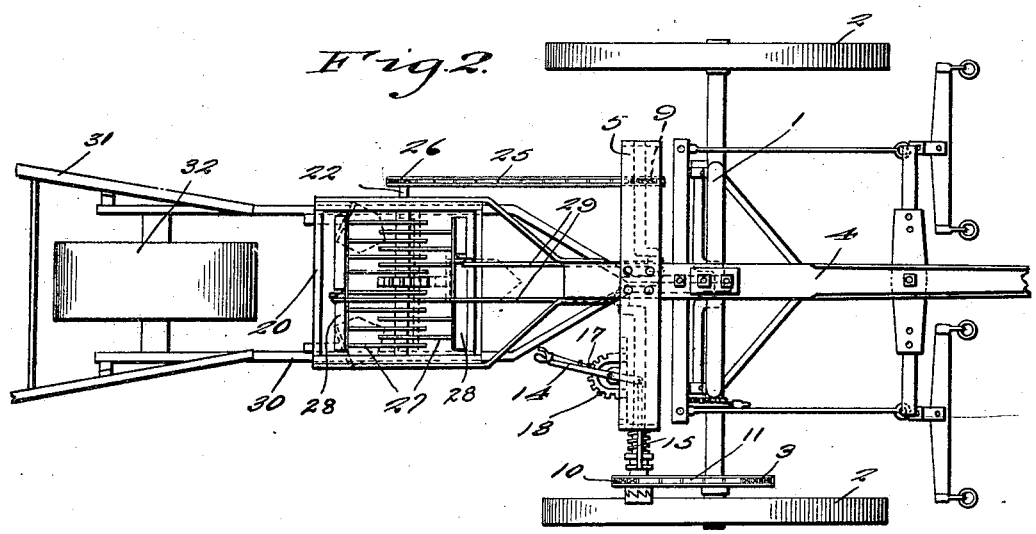

July 29, 1924.
J. T. CRAWFORD
CULTIVATOR ATTACHMENT
Filed April 25, 1923
1,503,414
2 Sheets-Sheet 2
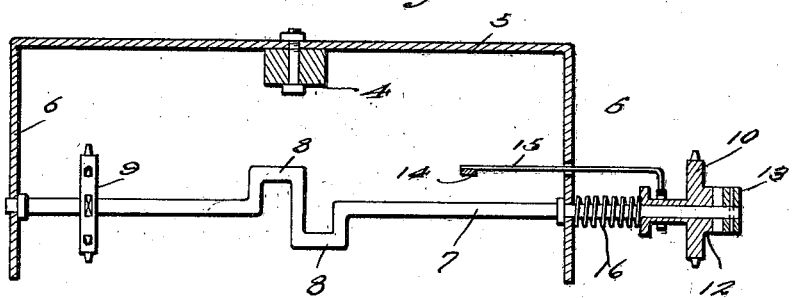
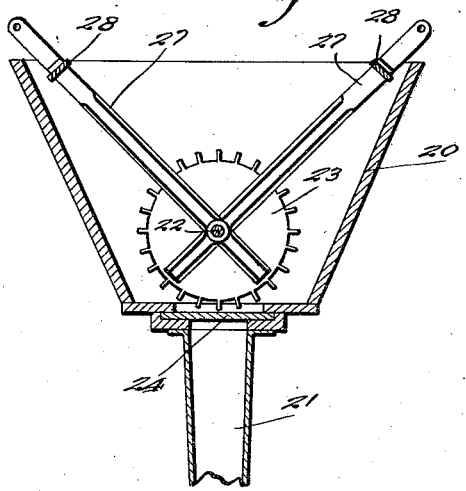
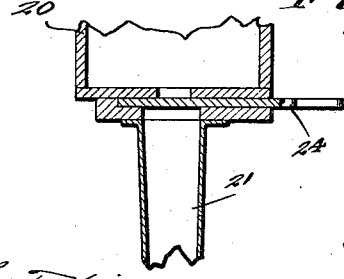
J. T. Crawford INVENTOR
BY Victor J. Evans ATTORNEY
WITNESSES Patented July 29, 1924.

1,503,414

UNITED STATES PATENT OFFICE.

JAMES T. CRAWFORD, OF MERIGOLD, MISSISSIPPI, ASSIGNOR OF ONE-HALF TO WM. I. BOWMAN, OF BOGUE CHITTO, MISSISSIPPI.

CULTIVATOR ATTACHMENT.

Application filed April 25, 1923. Serial No. 634,594.

*To all whom it may concern:*

Be it known that I, JAMES T. CRAWFORD, a citizen of the United States, residing at Merigold, in the county of Bolivar and State of Mississippi, have invented new and useful Improvements in Cultivator Attachments, of which the following is a specification.

One object of my said invention is the provision of improved means preferably in the form of an attachment, adapted to advantageously distribute nitrate of soda or other fertilizer while cultivating the ground.

Another object of the invention is to provide means, preferably in the form of an attachment, adapted for the use indicated and also adapted in combination with ground opening and covering means, also by preference in the form of an attachment, to be used to advantage for planting cotton.

To the attainment of the foregoing, the invention consists in the improvement as hereinafter described and definitely claimed.

In the accompanying drawings, forming part of this specification:—

Figure 1 is a side elevation of a two horse cultivator equipped with both of my novel attachments.

Figure 2 is a top plan view of the same.

Figures 3, 4, 5 and 6 are detail views illustrative of the novel means for depositing and distributing nitrate of soda or other fertilizer.

Similar numerals of reference designate corresponding parts in all of the views of the drawings.

In general the two horse cultivator illustrated is of ordinary well known construction, and includes a frame 1, ground wheels 2 to one of which is fixed a sprocket gear 3, and a tongue 4.

In the preferred embodiment of my invention I employ for the support of the fertilizer distributing means a transverse carrier bar 5 that is appropriately fixed to the tongue 4 at the upper side thereof. At its ends the said bar 5 is provided with pendent portions 6 and in these latter is journaled a transverse shaft 7 that is equipped with cranks 8 and is also equipped with a sprocket gear 9 fixed to the shaft in appropriate manner. Loose on the shaft 7 in substantial alinement with the sprocket gear 3 is a sprocket gear 10 that is connected to the sprocket gear 3 through the medium of a belt 11. At its outer side the sprocket gear 10 is provided with a clutch member 12 and opposed to the clutch member 12 is a clutch member 13 that is fixed on the shaft 7 so as to always turn with the said shaft 7. The sprocket gear 10 and clutch member 12 are capable of being adjusted endwise of the shaft into and out of engagement with the clutch member 13. An appropriately supported lever 14 is connected through a rod 15 with the sprocket gear 10 so as to disengage the member 12 from the member 13 against the action of a spring 16 on the shaft 7; the said lever 14 being provided at 17 with a detent for cooperation with a segmental rack 18 carried by the bar 5, this provision being made in order that the clutch member 12 may be adjustably fixed out of engagement with the clutch member 13 as when it is desired for the shaft 7 to remain idle during a traverse of the cultivator. Appropriately connected with the carrier bar 5 is a hopper 20 from which depends a discharge spout 21. Journaled in the hopper 20 is a shaft 22 on which is a toothed agitating or feed wheel 23. It will also be noted that the hopper contains a valve plate 24. The shaft 22 is driven from the sprocket gear 9 through the medium of a sprocket belt 25 and a sprocket gear 26 fixed on the shaft 22. Fulcrumed on the shaft 22 and arranged for oscillatory movement in the hopper 20 are sets of knives 27 each set of knives being carried by a head 28, and the two heads 28 being connected through the medium of rods 29 with the before mentioned cranks 8 of the shaft 7.

It will be readily understood from the foregoing that in operation, the shaft 7 will be driven during a traverse of the cultivator from one of the ground wheels 2, and it will also be understood that with the hopper 20 supplied with nitrate of soda or other fertilizer, the fertilizer will be adequately agitated in the hopper 20 and will be evenly discharged through the spout 21. It will also be appreciated that the sets of knives mounted to oscillate in the hopper 20 will effectively break up lumps of the fertilizer so that the fertilizer will be discharged through the spout 21 in a comminuted state as is always desirable.

My improved means also contemplates the employment of the hopper described and the elements associated therewith for the planting of cotton seed, and when the said hopper 20 is put to such use I employ the ground opening and cover attachment illustrated in Figures 1 and 2, the said attachment including a frame 30 pivotally connected to the axle, or any other appropriate part of the cultivator, rearwardly directed handles 31 on said frame, a packing wheel 32, an opening plow 33 carried by the frame 30 and covering plows 34 also carried by the frame 30 and relatively arranged as illustrated to the opening 33. It will be noted that the frame 30 is generally arranged under the spout 21 of the hopper 20, and that the arrangement is also such that the seed from the spout 21 will drop behind the opening plow 33 so as to assure the deposit of the seed in the furrow opened by the plow 33, and the adequate covering of the seed by the plows 34. Manifestly because of the gravitational action of the frame 30 the wheel 32 will be enabled to properly pack or guard the ground over the covered seed.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of the parts inasmuch as in the future practice of the invention various changes and modifications may be made such as fall within the scope of my invention as defined in my appended claim.

Having described my invention, what I claim and desire to secure by Letters Patent, is:—

The combination of a hopper having a discharge spout, a wheel mounted in the hopper, a driving connection for said wheel, oscillatory sets of swinging knives pivotally mounted in the hopper, the driving connection for the wheel including a shaft, and the knives of the sets being fulcrumed at intermediate points of their lengths of the said shaft, and some of the knives of both sets being arranged at one side of the wheel and other knives of both sets being arranged at the opposite side of the wheel, a crank shaft spaced from the hopper, and rods interposed between and connecting said shaft and the upper ends of the knives.

In testimony whereof I affix my signature.

JAMES T. CRAWFORD.